United States Patent
Azanza Ladrón et al.

(10) Patent No.: US 10,872,488 B2
(45) Date of Patent: Dec. 22, 2020

(54) METHOD FOR AUTHENTICATING A DOCUMENT

(71) Applicant: VERIDAS DIGITAL AUTHENTICATION SOLUTIONS, S.L., Tajonar (ES)

(72) Inventors: Eduardo Azanza Ladrón, Mutilva Baja (ES); Guillermo Barbadillo Villanueva, Mutilva Baja (ES); Mikel Sanchez Yoldi, Mutilva Baja (ES); Miguel Isla Urtasun, Mutilva Baja (ES); Sonia Goñi López, Mutilva Baja (ES)

(73) Assignee: VERIDAS DIGITAL AUTHENTICATION SOLUTIONS, S.L., Tajonar (ES)

( * ) Notice: Subject to any disclaimer, the term of this patent is extended or adjusted under 35 U.S.C. 154(b) by 0 days.

(21) Appl. No.: 16/304,815

(22) PCT Filed: Jun. 3, 2016

(86) PCT No.: PCT/EP2016/062651
§ 371 (c)(1),
(2) Date: Nov. 27, 2018

(87) PCT Pub. No.: WO2017/207064
PCT Pub. Date: Dec. 7, 2017

(65) Prior Publication Data
US 2019/0251774 A1    Aug. 15, 2019

(51) Int. Cl.
G07D 7/206    (2016.01)
G01N 21/84    (2006.01)
(Continued)

(52) U.S. Cl.
CPC ............ G07D 7/206 (2017.05); G01N 21/84 (2013.01); G06K 9/00288 (2013.01);
(Continued)

(58) Field of Classification Search
CPC ...... G07D 7/206; G01N 21/84; G06T 7/0002; G06T 7/97; G06T 7/60; G06T 7/40;
(Continued)

(56) References Cited

U.S. PATENT DOCUMENTS 6,708,309 B1 *   3/2004   Blumberg ............... G06T 11/00
                                                    382/305
6,988,093 B2 *   1/2006   Pic .......................... G06F 16/40
(Continued)

FOREIGN PATENT DOCUMENTS

WO    WO 2015/042485 A1    3/2015

OTHER PUBLICATIONS

International Search Report and Written Opinion dated Feb. 10, 2017 for International Application No. PCT/EP2016/062651, 11 pages.

*Primary Examiner* — Zaihan Jiang
(74) *Attorney, Agent, or Firm* — Squire Patton Boggs (US) LLP

(57) ABSTRACT

An authenticating method for authenticating a document from obtained images of the document, by determining an authenticity indicator of the document by verifying whether a meta-characteristic satisfies a predefined threshold associated to the meta-characteristic, the meta-characteristic being a measurement of a difference of a parameter of a detected element relative to a reference parameter of a reference model; and also an authenticating method for authenticating an identity of a person comprising performing the authenticating method for authenticating a document of the person, the document being an ID document, and deter-
(Continued)

100
Receiving image(s) of the (ID) doc.    101

▼
Detecting element(s) of the (ID) doc.    102

▼
Obtaining parameter(s) of detected element(s)    103

▼
Determining meta-characteristic(s)    104

▼
Determining an authenticity indicator of the (ID) document    105 mining an alikeness indicator by comparing a first face image and a second face image, using an image processing method; and authenticating the identity of the person depending on a result of the authenticating method performed for authenticating the ID document and whether the determined alikeness indicator is within an alikeness threshold.

20 Claims, 4 Drawing Sheets

(51) Int. Cl.
*G06T 7/00* (2017.01)
*G06T 7/60* (2017.01)
*G06T 7/90* (2017.01)
*G06T 7/40* (2017.01)
*H04N 5/235* (2006.01)
*G06K 9/00* (2006.01)
*G06K 9/62* (2006.01)
*G07D 7/20* (2016.01)
*B42D 25/23* (2014.01)
*B42D 25/24* (2014.01)
*B42D 25/29* (2014.01)
*B42D 25/36* (2014.01)

(52) U.S. Cl.
CPC ....... *G06K 9/00469* (2013.01); *G06K 9/6215* (2013.01); *G06T 7/0002* (2013.01); *G06T 7/40* (2013.01); *G06T 7/60* (2013.01); *G06T 7/90* (2017.01); *G06T 7/97* (2017.01); *G07D 7/20* (2013.01); *H04N 5/2354* (2013.01); *B42D 25/23* (2014.10); *B42D 25/24* (2014.10); *B42D 25/29* (2014.10); *B42D 25/36* (2014.10); *G06T 2207/10152* (2013.01); *G06T 2207/30144* (2013.01); *G06T 2207/30176* (2013.01); *G07D 2207/00* (2013.01)

(58) Field of Classification Search
CPC .... G06T 7/90; H04N 5/2354; G06K 9/00469; G06K 9/00288; G06K 9/6215; B42D 25/36
USPC .......................................................... 348/161
See application file for complete search history.

(56) References Cited

U.S. PATENT DOCUMENTS

| | | | |
|---|---|---|---|
| 2003/0099379 A1* | 5/2003 | Monk | G06K 9/00442 382/115 |
| 2004/0223197 A1* | 11/2004 | Ohta | G06K 9/00456 358/538 |
| 2005/0289199 A1* | 12/2005 | Aphinyanaphongs | G06F 16/35 |
| 2011/0211760 A1* | 9/2011 | Boncyk | G06K 9/00671 382/190 |
| 2012/0226600 A1* | 9/2012 | Dolev | G06K 9/6203 705/38 |
| 2014/0091566 A1* | 4/2014 | Vasiliev | G07D 7/2041 283/67 |
| 2014/0279516 A1* | 9/2014 | Rellas | G06F 21/44 705/44 |
| 2016/0078307 A1* | 3/2016 | Pawlik | G06K 9/00577 235/375 |
| 2016/0182741 A1* | 6/2016 | Takei | H04N 1/0044 358/1.6 |
| 2018/0035918 A1* | 2/2018 | Emalfarb | G01G 19/44 |
| 2018/0114393 A1* | 4/2018 | Kerver | G06T 7/0002 |

* cited by examiner

Receiving image(s) of the (ID) doc.  101

▼

Detecting element(s) of the (ID) doc.  102

▼

Obtaining parameter(s) of detected element(s)  103

▼

Determining meta-characteristic(s)  104

▼

Determining an authenticity indicator of the (ID) document  105

| Obtaining parameter(s) (parameter1...parameter M) for element(s) of (ID) document_1 | ... | Obtaining parameter(s) (parameter1...parameter M) for element(s) of (ID) document_N |

201                                              201

▼

Storing average and standard deviation (avg_param1 dev_param1 to avg_paramM, dev_paramM) as reference_parameters in database DB

202

Obtaining parameter(s) (parameter1'...parameter M') for element(s) of (ID) document_Y

203

▼

Calculating meta-characteristic(s) (meta-characteristic1...meta-characteristicM)

Obtaining parameter(s) (parameter1...parameterM) for element(s) of (ID) document_X and decoding unique identifier

301

Storing parameter(s) (parameter1...parameterM) as reference_parameters in database DB

302

Obtaining parameter(s) (parameter1'...parameterM') for element(s) of (ID) document_Y and decoding unique identifier

303

Calculating meta-characteristic(s) (meta-characteristic1...meta-characteristicM)

304

Fig. 4
400
Performing authentication of an (ID) doc. — 100
Receiving first face image(s) of the person — 401
Receiving second face image(s) of the person included in the ID doc. — 402
Determining alikeness indicator — 403
Authenticating the identity of the person — 404

METHOD FOR AUTHENTICATING A DOCUMENT

FIELD OF THE INVENTION

The present disclosure relates to methods, devices and computer program products for authenticating a document. The present disclosure is also related to an authenticating method for authenticating the identity of a person.

BACKGROUND

In the last years, digital enrolment and payment have increased all over the world. Portable devices, e. g. mobile phones, are replacing personal desktop as a payment tool. At the same time, con men are developing new types of fraud to access personal data from the Internet. Authentication process is the most sensitive stage that users must face. To sum up, this process consists in verifying that the person is who really is supposed to be and analysing that the user data is correct. These two types of validations are called person validation and ID validation (for instance an identity document).

There are four rules to check:
1. If an ID is validated and the holder too, then the authentication process is correct.
2. If an ID is validated but the holder does not, then the authentication process is not correct. This case occurs, for example, when a con man steals a real ID and tries to use it.
3. If an ID is not validated but the holder does, then the authentication process is not correct. This case occurs, for example, when a forger modifies an ID and tries to use it.
4. If an ID is not validated and the holder neither, then the authentication process is not correct.

The authentication process can be made based on any of the three types of security measures which are present in the (ID) document. Security measures of type one are those that can be checked by human eye. Security measures of type two are those that can be checked by a specific sensor. Finally, security measures of type three are those that are implemented but are only known by the manufacturer.

Further to the document validation, for instance the identity document or a bank note, it is a really difficult subject due to the next factors:
  Differences between counties.
  Differences in shape. The cutting edges of the document have big tolerances.
  Differences in impression. Each (ID) document is filled out in different branches.
  Physical state: broken ID documents, printing errors (ink removed), folded documents, missing of the chip, etc.

Identity documents such as identity cards are usually manufactured using various manufacturing processes that are performed on different machines located in different government buildings. The last stage is the impression of user data such as name, last name or date of birth. The different manufacturing processes have a variability that causes significant differences between different documents of the same type.

Regarding person validation, the most common procedure is based on taking a photo or video of a user and comparing it with a photo or video previously obtained. However, this procedure of person validation could be broken showing a photo or video of the user (victim) got from social networks in front of the camera device.

Therefore, it is necessary to obtain an authentication process for validating both the document and the person, which is safer and more robust to implement than the known authentication processes.

SUMMARY

In a first aspect, an authenticating method for authenticating a document is provided. This authenticating method for authenticating the document may comprise:
  receiving one or more obtained images of the document;
  detecting one or more elements of the document;
  obtaining at least one parameter of the detected elements, by processing the obtained one or more images of the document using an image processing method;
  determining at least one meta-characteristic by comparing at least one parameter of the detected elements to al least one reference parameter of one or more pre-obtained elements;
  determining an authenticity indicator of the document by verifying whether the at least one meta-characteristic satisfies at least one predefined threshold associated to the at least one meta-characteristic, wherein
  a meta-characteristic is at least one measurement of a difference of at least one parameter of a detected element relative to at least one reference parameter of at least one reference model; the reference model comprising the one or more pre-obtained elements.

This authenticating method for authenticating a document, for instance an ID document or the like, is safer and more robust than the prior art solutions since it is based on analysing meta-characteristics which are a security measure stronger than security measures typically implemented.

A "meta-characteristic" is a measurement of the deviation or difference of at least one parameter of a detected element relative to the same parameter (at least one reference parameter) of a reference model, that may be inherent to a random manufacturing tolerance of a process used to manufacture the element to be detected on the document, or it may be created on-purpose. The meta-characteristics refer to all parameters of the elements that form a document measuring deviations (differences) of these elements with respect to a reference model. Said tolerances will be higher or lower depending on the element and the manufacturing process employed. Thus, any element undergone a manufacturing process to be comprised into the document may be "meta-characterizable", that is it may contain meta-characteristics.

According to the present invention certain parameters are used as a security measure of the document that are not proper safety measures. That is, for instance the difference in spacing between characters, the alignment between text fields, color intensity, etc. have not been placed in the way they are to be printed security measures. Checksums, the presence of the CLI, the OVI ink, the kinegram, etc. are safety elements that have been defined as such. This makes it very difficult work of a forger who can obtain information regarding security measures that explicitly have been developed, but have more difficulty obtaining information from a security measure that is not so, unless they know the manufacturing tolerances, which it is simply more difficult.

Another advantage of using the present method based on analysing meta-characteristics is that said meta-characteristics may be a security measure whose order of magnitude of work is the micron. The relative distances between characters, or the height difference between them can only be explained using measures less than a millimeter. This differs from other security measures whose order of work is based on millimeter, or even cent meter, such as the aforementioned CLI, the kinegram, etc. The text falsification accuracy of a counterfeited document should be on the order of a tenth of a millimeter, it is undoubtedly a very complex task and may be virtually impossible unless the forger has obtained sophisticated machines similar to those used by government agencies.

Furthermore the meta-characteristics may be a security measure that controls the most common modifications made by counterfeiters. Some of these are altered date of birth, or the impersonation by the technique of scraping and subsequent writing false identity.

In some examples of the authenticating method, comparing at least one parameter of the detected elements to at least one reference parameter of pre-obtained elements may comprise:
  obtaining at least one reference parameter by calculating at least one statistical element of at least one parameter of pre-obtained elements of a plurality of documents; wherein
  the predefined threshold comprises the at least one statistical element.

The reference parameter may be used as a security measure that can only be determined by counting with a large database of real documents (statistical analysis). It may be easy for a counterfeiter to focus on handling a security measure if he can focus on a simple document, for example, his. But it is certainly more difficult to access a database of real documents to determine manufacturing tolerances.

In some examples of the authenticating method, comparing at least one parameter of the detected elements to at least one reference parameter of pro-obtained elements may comprise:
  decoding at least part of the detected elements tor obtaining a unique identifier of the document;
  accessing at least one database of reference parameters of pre-obtained elements by using the obtained unique identifier of the document.

Using the unique identifier of the document and comparing it with a document as issued with the same univocal identifier (analysis of uniqueness) allows to reduce the permissible threshold for validation at much lower manufacturing tolerances threshold values.

In some examples of the authenticating method the at least one reference parameter of at least one pre-obtained element is obtained at or after the time of manufacturing the document by:
  detecting one or more elements of the document;
  determining at least one parameter of at least one element of the document;
  decoding at least part of the detected elements for obtaining a unique identifier of the document;
  storing the unique identifier and the at least one parameter of at least one element of the document in the database as at least one reference parameter.

In some examples of the authenticating method, the document to be authenticated may be for instance an ID card, driving license, credit, debit, business, medical, insurance card, passport, tickets, etc. or any other documentation able to be used for instance identify at least one person or being used in transactions such as bank notes, cheques, etc. or the like.

In some examples of the authenticating method, the at least one element is at least one of: pattern and drawing element, text element, light sensitive element, optical sensitive element. IR sensitive element, UV sensitive element, magnetic sensitive element, thermal sensitive element.

The most of the above elements can be detected through a conventional vision camera without necessarily requiring any special lighting and only those elements sensitive to infrared light, ultraviolet light, magnetic fields or temperature require special sensors to be detected. This makes the present method extremely easy to implement An authenticating method for authenticating an identity of a person is also disclosed. The authenticating method for authenticating the identity of a person may comprise:
  performing an authenticating method for authenticating a document of the person as above described, the document being an ID document;
  receiving one or more first face images of the person;
  receiving one or more second face images of the person included in the ID document by processing one or more images of the ID document using an image processing method, said one or more images of the ID document being received by the authenticating method performed for authenticating the ID document;
  determining an alikeness indicator by comparing the one or more first face images and the one or more second face images, using an image processing method; and
  authenticating the identity of the person depending on a result of the authenticating method performed for authenticating the ID document and whether the determined alikeness indicator is within an alikeness threshold.

With the above cited authenticating method for authenticating the identity of a person performing the above described authenticating method for authenticating an ID document, cannot be broken showing a photo or video of the user (victim) got from social networks in front of a camera device as the prior art solutions.

The present authenticating method may be used for instance:
  In digital banking as a way to gain new clients remotely. Also as a way to update the data of clients which the bank already has, for example when a client ID card expires.
  The previous point may be extended to the registration process in other entities such as hotels, transport, notaries procedures, etc.
  As a way of verifying the identity of a person and his/her ID document by the relevant security authorities: police, military, private security, etc.
  As a tool to control people in borders or airports. Specifically, it could be a tool used by an ABC (Automated Border Control System).

In another aspect, a computer program product is disclosed. The computer program product may comprise program instructions for causing a computing system to perform a method of authenticating according to some examples disclosed herein.

The computer program product may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the processes. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device of means.

Alternatively, the earner may be an integrated circuit in which the computer program is embedded, the integrated circuit being adapted for performing, or for use in the performance of, the relevant methods.

BRIEF DESCRIPTION OF THE DRAWINGS

Non-limiting examples of the present disclosure will be described in the following, with reference to the appended drawings, in which:

FIG. 1 illustrates a flow diagram of an authenticating method particularly for authenticating an (ID) document according to the present invention.

FIG. 2 illustrates a flow diagram to compare at least one obtained parameter to at least the same reference parameter following a statistical analysis.

FIG. 3 illustrates a flow diagram to compare at least one obtained parameter to at least the same reference parameter following a uniqueness analysis.

FIG. 4 illustrates a flow diagram of an authenticating method particularly for authenticating an identity of a person according to the present invention.

DETAILED DESCRIPTION OF EXAMPLES

FIG. 1 illustrates a flow diagram of an authenticating method particularly for authenticating an (ID) document 100 which may be performed by using a device with a camera. This device may be any kind of electronic device capable of taking pictures such as a mobile phone, a (action) camera, a tablet, a smart watch, etc.

The document may be for instance an ID card, driving license, credit, debit, business, medical, insurance card, passport tickets, etc. or any other documentation able to be used to identify at least one person, or even a bank note, cheque, or the like. Although the present detailed description is related to an ID document it should be understood that may applied to any other document to be authenticated. The ID document is only a possible example (or implementing the present invention.

The present authenticating method may be carried out by the device itself or by the device in data communication with at least one server. In a first example of architecture the device might be a mobile device such as a smartphone with a camera or the like: this option is feasible owing to the improving in the capability of the processor and other components which has been developed in last years. In a second example of architecture, the device might be a mobile device with a camera provided with means for establishing a data communication with a kind of sever. In this way the mobile device could perform capture and send data to the server which could perform computation for the mobile device, i.e. the server receives the captured/obtained data. Furthermore, the server could have also a database or be in data communication with a database. Once the data are duly processed they could be sent back to the device. The communication between the device and the server could be implemented by any known system in the art being wireless and/or wired.

The device could be provided with at least one of UV, IR and/or visible illumination sources and sensors so that elements in an ID document may be captured and verified under different illumination conditions. Said element/s may comprise at least one of the following classified ones:

Pattern and drawing elements may comprise:
    Logo.
    Flag.
    Anti-scan patterns.
    Background image patterns.
    Bar codes.
    Eyelets.
    Rivets.
    Fingerprints.
    Guilloches.
    Planchettes.
    Rip cuts.
    Security fibres.
    Security thread.
    Watermark.
    Elements with bleeding ink.
    Covert laser readable image (CLR).
    Holographic microparticles OVDot.
    Irisdescent laminates.
    Overprint laminates.
    Latent image mask.
    Latent scrambled image.
    Moire variable colour (MVC).
    Chips.

Text elements, depending on the quantity thereof, may comprise:
    Character.
    Word (group of characters).
    Textfield (group of words).

Text elements, depending on the size thereof, may comprise:
    Text, visible to the human eye, which may comprise character, word or textfield.
    Microtext (non visible or non-distinctly visible to the unaided human eye) which may comprise character, word or textfield.
    Nanotext (size is smaller than microtext by at least 3 orders of magnitude) which may comprise character, word or textfield.

Light sensitive elements (sensitive to the visible light) which may comprise:
    Clear window.
    Diffractive element did patch (DID).
    Glossy laminate overprint.
    Hologram images.
    Kinegram Images.
    Retroreflective images.
    Secure core print (SCP) patterns.
    See-through register images.

Optical sensitive elements (sensitive to orientation) which may comprise:
    Floating images.
    Hologram images.
    Kinegram images.
    Latent filler image (LFI).
    Latent image kipp.
    Latent image peak.
    Latent multicolour image.
    Changeable laser image (CLI).
    Multiple laser image (MLI).
    Optically variable identification element (FEEL-ID & FUSE-ID).

Elements with optically variable ink (OVI).
Elements with optically variable magnetic ink (OVMI).
Optically variable printed image dynaprint.
IR sensitive elements (sensitive to infrared light) which may comprise:
Elements with anti-stokes ink.
Document numbers with IR features.
Security fibers with IR-fluorescent ink.
Texts with IR-fluorescent inks.
UV sensitive elements (sensitive to UV light) which may comprise:
Bar codes with UV inks.
Document numbers with UV features.
Elements with photochromic ink.
UV-fluorescent HI-lites.
Elements with UV-fluorescent ink.
Magnetic sensitive elements (sensitive to magnetic fields) which may comprise:
Bar codes with ferromagnetic components.
Document numbers with magnetic components.
Thermal sensitive elements (sensitive to temperature) which may comprise:
Elements with thermochromic ink.

The manufacturing processes which may be employed for creating ID documents and may produce the above mentioned meta-characterizable elements may comprise at least one of the following ones:
Offset printing.
Rainbow printing.
Orlov printing.
Letterpress printing.
Dot matrix printing.
Laser printing (xerography).
inject printing.
Dye-sublimation printing.
Thermal transfer printing.
Thermographic printing.
Gravure printing.
Screen printing.
Lenticular printing.
Intaglio printing.
Mechanical erasure.
Mechanical perforation
Chemical erasure.
Chemical demetallization.
Laser erose.
Laser engraving.
Laser perforation.
Laser demetallization.
Foil stamping.
Wet stamping.
Dry stamping.
Blind embossing.
Electron-beam lithography.
Slit raster technology.
Additive manufacturing It may be envisaged any other manufacturing process suitable for producing the above mentioned meta-characterizable elements.

The authenticating method for authenticating an ID document 100 may comprise some steps which will be described in the following:

Receiving one or more images of the ID document 101. The number of images could vary depending on the implementation, for Instance one image of the front side of the ID document or an image of each the front and the back side of the ID document and so on. If the device comprises a camera then the one or more images are obtained by the device itself, i.e. the camera takes pictures and sends them to the processing means which receives them, but if the device comprises for instance a mobile device and a server then the server receives the one or more images obtained by the mobile device. The obtained images may be stored in a database or the like and may be received by the processing means of the server.

According to an example, for obtaining the one or more images of the ID document the present method may comprise determining when the camera is capturing a complete view of the ID document by using an image processing method based on artificial intelligence, trained to detect the said ID document and automatically shooting the camera when said processing method determines that the said complete view of the ID document is depicted. This automatic detection for ID documents helps the user to take the needed picture under the best conditions and eliminating the shaking produced by the hand movement when the camera's shutter is manually operated.

If the server and the device are separate units, the server could send a command to control the camera of the device.

A possible solution for performing an automatic detection for ID documents, may be done for instance through Local Binary Pattern (LBP) or HAAR descriptors.

When obtaining through the camera the one or more images of the ID document, the present method may additionally comprise adjusting one or more focusing and lighting conditions by regulating the illumination unit of the camera. This may be done automatically by the device with the camera itself of receiving the corresponding command from the server. The user does not need to regulate the lighting and focusing conditions.

Additionally, the method may comprise setting a focus unit of the camera to a fixed-focus mode, so the device may obtain a properly focused picture of the ID document.

At least some of the one or more images of the ID document could be obtained taking into account different orientations of the camera with respect to the ID document. The user may be notified by the device to change the orientation of the device and/or the camera through any kind of warning means such as image and/or sound and/or vibration means. Changing the camera orientation over the ID document may reveal optical sensitive elements (sensitive to orientation) which have been above described.

In order to correct the perspective of the document an image processing method could be applied, for both frontal and tilted images, to detect the elements located in the document in a perfectly undistorted image of the document. The image processing method could be any available in the stale of the art.

Obtaining the one or more images of the ID document may further comprise obtaining at least two photos of the ID document wherein at least one is taken with flash and at least one is taken without flash to maximize the benefits of flashing the ID document such a way to detect light sensitive elements). The at least two photos may be taken in a random order, separated by a random time lapse, for instance less than 500 milliseconds which can be duly amended.

To avoid fraud (replacing the fake ID document with another flashed-faked ID), the photos may be almost simultaneously taken and processed avoiding the replacement of the ID document. In order to assert that both images belong to the same ID document, several features may be compared amongst them, including text, OCR data and patterns.

As an additional measure for avoiding the replacement of the ID document between both photos, the present authenticating method may further comprise generating at least one video signal between the capture of the at least one photo taken with flash and the at least one photo taken without flash; and processing the at least one video signal using a motion detection method for detecting whether the ID document has been replaced between the capture said at least one photo taken with flash and said at least one photo taken without flash.

Depending on the requirements of a particular ID document, the image could be obtained taken into account the combination of a particular orientation of the camera related to the ID document and the use of the flash for detecting specific elements.

All this, make it possible to work with a sufficient quality image to study the elements an ID document.

Detecting one or more elements of the ID document 102 and obtaining at least one parameter of the detected elements 103, by processing the obtained one or more images of the ID document using an image processing method. This detection may be performed in the device itself or in the server which has received data from the device.

An example for detecting one or more elements on the ID document may comprise performing an image processing method by training one or more neural networks with a set of images using machine learning techniques in such a way that the output of those networks represents the at least one parameter of the detected elements.

Given a meta-characterizable element it is possible to obtain at least one meta-characteristic of said element. As a way of example, it can be cited different types of parameters of the detected elements: alignment, spacing, width, height, colour, texture, excess/defect of material . . . which differences against a reference model are the so called meta-characteristics.

The at least one meta-characteristic may comprise at least one measurement of difference in the parameter "alignment" deviation between the deviation of alignment of at least two different elements of the detected elements and the deviation of alignment of the same at least two different elements of the reference model.

Given an image of an ID document, it is possible to measure the difference in alignment between two meta-characterizable elements which ideally would form a straight line. This reference straight line is taken from the reference model. This difference in alignment is called "meta-alignment".

There is a direct relationship between the distance measured in pixels and the distance measured in microns since the number of microns per pixel can be predetermined or previously known based on the resolution of the camera, so it may be possible to determine and measure a misalignment between elements by processing the quantity of involved pixels. The relative position of the elements among each other is determined and then the relative deviation is calculated.

For instance, a 2.0 Spanish ID card must have the text fields name, first name, last name, date of birth and date of validity ideally aligned. However, the IDESP field may be misaligned with the above fields because it is printed in a different process. Therefore, processing the pixels of the captured/obtained image may provide the information to determine and measure the misalignment between text fields of an ID card.

The at least one meta-characteristic may comprise at least one measurement of difference in the parameter "spacing" between the difference in space of at least two different elements of the detected elements and the difference in space of the same at least two different elements of the reference model.

Given an image of an ID document, it is possible to measure the spacing between two meta-characterizable elements whatever they are. This separation is compared against a reference value (parameter) taken from the reference model. For example, it is possible to measure the distance between text fields, the distance between each character, the distance between a chip and the CLI, etc. This difference between spacings is called "meta-spacing". As above described it may be possible to determine and measure a space by processing the quantity of involved pixels. The number of microns per pixel may be previously known.

The at least one meta-characteristic may comprise at least one measurement of difference of the parameter "height" and/or "width" from a reference height and/or width model of at least one of the detected elements.

Given an image of an ID document, it is possible to measure the width and height of a meta-characterizable element by counting and determining the involved pixels which belong or do not belong to the element/s. This width and height are compared against a reference value (parameter) taken from the reference model. These difference in width/height are called "meta-width" and "meta-height" respectively. Therefore, processing the pixels of the captured image may provide the information to determine and measure the height and width of the meta-characterizable elements.

The at least one meta-characteristic may comprise at least one measurement of difference of the parameter "colour-related and/or texture-related" from a reference colour-model and/or texture-model (parameter) of at least one of the detected elements. These differences are called "meta-colour" and "meta-texture" respectively.

In some documents it is possible to define a valid range for the ink used in the printing of some elements, for example, text characters colours. However, working with absolute colour values is complicated due to the dependence of these values on lighting. At other times, it may be defined the range of colours that is used in an element when it has been printed with a colour gradient. This case is easier to quantify since it measures differences in colour, hue, or intensity in specific regions of the image. To measure these differences in colour and/or texture, state of the ad techniques may be used.

Sometimes, the elements are not printed solidly or in a gradient, but contain a specific texture that has been printed voluntarily or even involuntarily. In the latter case, those textures that can be seen in some elements due to ink printing processes that performs the machine operation are included.

The at least one meta-characteristic may comprise at least one measurement of difference of excess/deficiency of the parameter "printing material" from a reference printing-model on at least one of the detected elements.

The manufacturing process of the meta-characterizable element depends on the machine used and the tolerances of this process. But it also depends on other factors that can influence the ink deposited on the paper. The process of ink absorption by the document depends on the thickness of the paper, which also has tolerances. The temperature and humidity of the environment in print time influences the speed of ink drying. The amount of ink in the reservoir of the printing machine may affect the volume of ink expelled in the printing process. All these factors result in unique prints, where elements of the same type (e.g. two characters of the same rank, two similar pattern images, etc.) are different from each other by excess or defect of ink in these elements respect the reference printing-model.

Using image processing techniques, it is possible to evaluate these excesses and defects n material, so that they can characterize each element individually and uniquely, and distinguish it from other elements of the same type. This difference between the reference printing-model and the actual element may be called "meta-material". The meta-material of an image element is a function defined n each of the n×m pixels of the image element and stores, in each pixel, information depending on whether the pixel of the element corresponds to an excess of material, a defect in material or a pixel whose value matches the reference printing-model of the element.

From the above it follows: for instance, that there are no two "A" characters in an ID document that are the same or that there are no two "1" characters in an ID document that are the same. Or at least, the likelihood is minimal. The characterization of an element of the ID document through the excesses and defects of ink regarding its reference printing-model is a security measure to assess the similarity between elements of the same type in the ID document.

For instance, three characters of value "1" printed on the same ID document. The first one may have an apparent excess of ink on its right side. The second one may nave missing ink on top. The third one may not contain defects of material as outstanding as the previous two. Therefore by image processing techniques the excesses and defects of ink regarding its reference printing-model may be determined and measured.

The accuracy of the meta-characteristics depends on the resolution of the camera used. The higher the resolution, the higher accuracy. Below is presented a summary table showing an example of the dependence of the accuracy with resolution:

| Size (mm) | 1 |
|---|---|
| Precision in measures in pixels | 4 |

| Resolution | MPx | Height pixels | Microns per pixel | Detected deviation in microns |
|---|---|---|---|---|
| 2048 × 1536 | 3 | 38 | 26 | 104 |
| 3264 × 2448 | 8 | 60 | 17 | 68 |
| 4032 × 3014 | 12 | 74 | 14 | 56 |
| 7680 × 4800 | 35 | 118 | 8 | 32 |

The table above stews a study for a text character height of 1 mm photographed at different resolutions. The higher the resolution, the microns represented in a pixel are less. If it is considered that the ability to detect deviations by image processing techniques is for instance 4 pixels, then the maximum precision that can be obtained by multiplying by four the number of microns per pixel is obtained.

The previous study shows that even with 3MPX resolution cameras it can be detected deviations higher than about 100 microns. This is an advantage over other security systems that are more dependent on the resolution of the camera.

The previous study was developed for a given distance between the camera and the ID document. If the distance decreases, the number of microns by pixel also decreases, increasing accuracy. Regardless of the height, the fundamental idea of the study is to show the dependence of the meta-characteristics with camera resolution and it is possible to obtain good precision, even a tenth of a millimetre, for low-resolution cameras.

Determining at least one meta-characteristic 104 by comparing at least one parameter of the detected elements to at least one reference parameter. This meta-characteristic may take any absolute value and if there is no difference that amount will be zero. This determination may be performed by the device itself or by the server which has received data from the device.

Determining an authenticity indicator of the ID document 105 by verifying whether the at least one meta-characteristic satisfies at least one predefined threshold associated to the at least one meta-characteristic. This determination may be performed by the device itself or by the server which has received data from the device. The information determining the authenticity indicator may be sent to the device or be available in the server itself. This information may indicate whether the ID document is authentic or not.

Comparing at east one parameter of the detected elements to at least one reference parameter could be done following two different options (respectively shown in FIGS. 2 and 3): statistical analysis and uniqueness analysis, in any case the reference parameters have to be pre-obtained in order to calculate the measured meta-characteristics.

The statistical analysis (FIG. 2) of a set of documents not forged makes it possible to obtain parameters for the manufacturing tolerances of each element of the document. Thus, for each element may be calculated for instance the deviation of alignment relative to any other element, the dimensions (width and height), the spacing with other elements, the colour and texture, and the characterization of excess and defect of material.

The mean-average and standard deviation (statistical elements) of each of the above cited parameters (from 1 to M) of the pre-obtained elements are calculated measures that may be used as reference parameters, for instance the average may be called avg_param and the standard deviation dev_param. The reference parameters may be obtained from pre-obtained elements 201. The statistical element/s used as a reference parameter/s may comprise at least one of: mean-average, median-average, mode-average, standard deviation or the combination thereof. It may be envisaged any other statistical element but in the present example the mean-average (or simply "average" from now on) and the standard deviation will be exemplary used.

The predetermined quantity N of not forged ID documents used for carrying out the statistical analysis may vary depending on the aimed accuracy, but the more quantity of analysed ID documents, the more accuracy is obtained. With this analysis several reference-parameters i.e. from avg_param1, dev_param1 to avg_paramM, dev_paramM could be stored in a database DB 202. This database DB may be stored in the device itself or in a server or the like.

Once the statistical analysis is performed, its results are used as a tool to validate the authenticity of any ID document afterwards. Now, for any ID document to be validated (ID document_Y), which has not been used in the statistical analysis, it is possible to calculate the meta-characteristics of at least one of its elements. That is, it is possible to calculate the difference of at least one parameter (for instance from parameter1' to parameterM') of at least one element obtained from the ID document to be validated with respect to the reference parameter statistically inferred. The meta-characteristic/s (meta-characteristic1 . . . meta-characteristicM) are then calculated 204 by comparing the at least one reference-parameters of the pre-obtained elements to at least the same parameter (parameter1' to parameterM'). Such parameters are obtained from the element/s of ID document_Y 203. For instance, the predefined threshold associated to the at least one meta-characteristic used for determining an authenticity indicator of the ID document 105 may be a combination of the average avg_param1 . . . avg_paramM and the standard deviation dev_param1 . . . dev_paramM associated to each parameter1 . . . parameterM, or at least one of the average and the standard deviation.

In FIG. 3 is also illustrated a second and alternative option which is called analysis of uniqueness. This analysis consists in several stages. First, a picture of an ID document (ID document_X) is taken as a reference model at a time instant $t_1$, to obtain the parameter/s of its element's 301. Then, a value that uniquely identities this reference ID document against other ID documents of the same type is also obtained, for example, the number of ID, a serial number or other unique value (unique identifier) that may be present in the ID document. Subsequently, for each meta-characterizable element may be calculated the alignment relative to any other element, dimensions (width and height), spacing with other elements, colour and texture measure and excess and defect of material of the document captured at $t_1$. These calculated values are used as reference parameters (paramater1 to parameterM) and with the unique identifier may be stored in a database DB 302 in the device itself or in a server or the like. Afterwards at an instant $t_2$ (after instant $t_1$) the same procedure described above is performed, obtaining at least one parameter (from parameter1' to parameterM') of the ID document (ID document_Y) to be validated 303. The unique identifier of the ID document to be validated is decoded from the detected elements. This decoding may be performed by the device itself and/or the server.

The set of parameters (or one of them) that were obtained at the time instants $t_1$ and $t_2$ can be compared (this is a meta-characteristic) and verify that they are close to zero and not surpasses certain threshold (the meta-characteristic is close zero).

Thus, comparing at least one parameter of the obtained parameters to at least the same reference parameter may comprise:
- decoding at least part of the detected elements for obtaining a unique identifier #ID of the ID document, for instance the ID number at instant $t_2$;
- accessing at least one database DB or repository of reference parameters of pre-obtained elements by using the above obtained unique identifier #ID of the ID document.

As above explained that database DB could be located at the server itself or be located apart.

This uniqueness analysis allows to determine an authenticity indicator of the to-be-validated ID document based on whether the calculated meta-characteristic/s (meta-characteristic1 . . . meta-characteristicM) 304 is within a predetermined threshold associated to the particular meta-characteristic/s (with respect to the reference parameter of the ID document captured at $t_1$).

It can be seen from the above description that the need to detect a unique element as the number of ID document is motivated by the need to know against which to compare. A case occurs when the photograph of the model ID document at the instant of time $t_1$ is performed in the police station at the time of manufacturing or issuing the document. The parameters (alignment, spacing . . . ) are then stored in a database (in a device and/or a server) along with the number of ID document which corresponds, if a user wants to perform the method of the present invention with an ID document (ID document_Y) to be validated in an instant of time $t_2$, an application to validate its authenticity can take the picture, read (decoding among the elements) the number of ID and obtain the reference parameters for that number of ID. Then, meta-characteristics are calculated and an authenticity threshold will be used to determine if the document is valid.

Carefully considering both the statistical analysis and the analysis of uniqueness, it may be realized that in the first analysis the differences in parameters to compare (meta-characteristics), have the same order as the manufacturing tolerances. However, in the second analysis the meta-characteristics, may be much smaller than the manufacturing tolerances, since the comparison occurs between the reference parameters at $t_1$ and the obtained parameters at $t_2$ that characterize two ID documents with the same unique identifier. In other words, in the second analysis it is not about the document read at the instant of time $t_2$ has a variability that is bounded by manufacturing tolerances. It is, rather, that the variability detected is the same as the document read at the instant of time $t_1$.

In any case the authenticity indicator may assume for instance a positive decision on the authentication of the ID document if the amount of the deviation associated to the parameter (meta-characteristic) is less than or equal to a pre-determined threshold. Otherwise, the authenticity indicator may assume for instance a negative decision on the authentication of the ID document if the amount of the deviation is higher than the pre-determined threshold.

Further authenticity indicators of the ID document may be determined that complement the authenticity indicators calculated with the meta-characteristics analysis. The authenticating method may then further comprise:
- determining at least a further authenticity indicator of the ID document by verifying whether at least one authenticity validation satisfies at least one predefined requirement associated to the at least one authenticity validation.

The authenticity validation may comprise at least one of: logical text validations, micro-writing validations, validations of at least one optical sensitive element, and validations of at least one light sensitive element or combinations thereof.

Therefore the validation may be about security elements that change its behaviour with lighting and tilting conditions. Also, micro-writings are studied in this group. Logical validations are made regarding the information obtained in the OCR textfields.

Human eye cannot detect and read the micro-writings (MW) present in the ID document without the help of a magnifying glass. MW are widely used in security documents as overt security features, as they can only be obtained by high quality printing techniques of the industry, it is unlikely that a counterfeit of an ID document could have these micro-writings as well printed as the original ID document.

There could be micro-writings in both obverse and reverse sides of the ID documents. All kind of micro-writings (positive and negative for example) in both sides are located.

By way of example, a 2.0 Spanish ID card has a kinegram. In this kinegram, the Spanish coat of arms in colour is shown or the letters "DNI" and "ESP" that interchange their position depending where the flash has stroked. The kinegram and the frontal face photo are overlapped making mere difficult the forgery of the image and kinegram. Taken this into account, flashed and not flashed photos are studied to verify the frontal face consistence. Also, there are several relieves that are shown only when the flash strikes in the document: one has the word "ESPAÑA" written on it and other has several times the word "DNI" repeated all along the border and could be read with the micro-writing techniques.

Flashing the CLI window produces 3 effects: the colour of the background changes, the text appears more contrasted and several vertical lines are discovered. The number of lines and the variation of the colour follow certain rules and the characters in the CLI have to match with the date of expiration (by a difference of years, depending on the age of the holder) and the first consonant of surnames and name. Last but not least, in the top left, below the Spanish flag, there is a text printed with Optical Variable Ink (OVI) that changes its colour. Flashing it produces this effect and the correct variation in the colour is studied to certificate the originality of the document.

Locating the interesting fields (name, surname, date of birth . . . ) of the ID document is not easy due to the tolerances of the manufacturing cut (borders) and printing elements. Here, iterative procedures that in each step may reduce the error in locating the field are used as an image processing method. After locating the items needed, adaptive filters may be the key to character recognition. A proper pre-processing and cleaning may be performed in order to process characters. Again, iterative operations may be executed independently for each particular field until the expected conditions are met. For instance, cleaning the background, adaptive contrast and fuzziness and sharpening of borders techniques may be used in this stage for reading each region. The position of each character, of each word, of each group of words is determined for ID documentation validation.

Furthermore, the authenticating method may comprise processing the obtained one or more images of the ID document using an Optical Character Recognition (OCR) method for extracting text in a computer-readable format from the one or more images of the ID document. From this extracted text in a computer-readable format may be performed one or more logical validations, for obtaining a logical correctness indicator of the text. The one or more logical validations of the extracted text in computer-readable format may comprise detecting words in the extracted text and comparing the words against a pre-defined dictionary.

Names, surnames, etc. can vary a lot in length or in the number of words that are formed. The easiest way to decide if a read field is correct is to compare it against a dictionary. To compare words an algorithm based on n-grams is used. Each gram is evaluated and the word with the maximum similarity metric is selected as the correct one. Several databases with one dictionary each, one for each field (name, surname, province and city), are made. These databases could be updated dynamically to take into account the frequency of apparition of the words and may be stored in the device and/or server and/or a repository linkable to them, in addition, several fields are located in both obverse and reverse sides and can be compared one with the other. Also, there are some checksums in the reverse side that can be used to decide which one is the correct guess. All these previous work provides an almost perfect OCR recognition.

It can be verified whether the logical correctness indicator of the text is within a logical correctness threshold, which can be predefined for each case. This verification is made for determining the authenticity indicator of the ID document.

If the ID document comprises a chip containing data, the present authenticating method may comprise additionally receiving or obtaining said data from or with the device itself if such device is communication capable. Alternatively, the device or the server may be in data communication with a reader for retrieving data from chip. This data stored in the chip may comprise the at least one text data, image data, fingerprint data, signature data, biometric data and all the data readable by OCR among other valuable information. The data obtained from the ID document using image processing methods car be compared to at least one data stored in the chip and then determining the further authenticity indicator of the ID document.

It should be noted that the Near Field Communication (NFC) technology is only a non-limiting example for communicating pre-recorded data in the ID document. A RFID based technology or any other wireless technology could be used.

Additionally, an authenticating method for authenticating an identity of a person 400 can be carried out. FIG. 4 illustrates a flow diagram thereof. As above mentioned the present authenticating method may be carried out by the device itself having a camera or by the device in data communication with at least one server.

This authenticating method for authenticating an identity of a person may comprise:

Performing an authenticating method for authenticating an ID document 100 of the person as above described.

Receiving or obtaining through the camera, one or more first face images of the person 401. For instance, receiving or obtaining these images may comprise a face photo or video of the person. If a face video is received or obtained, the method may also comprise obtaining a depth field or 3D field of the face images of the person by processing the received/obtained face video of the person using an image processing method. They way to manage the camera is the same as above described.

Additionally, receiving or obtaining the one or more first face images of the person may comprise determining when the camera is pre-capturing a complete face view of the person by using an image processing method, and automatically shooting the camera when the camera is determined to be pre-capturing said complete face view of the person.

Receiving or obtaining one or more second face images of the person included in the ID document 402 by processing one or more images of the ID document using an image processing method, said one or more images of the ID document being received or obtained by the authenticating method performed for authenticating the ID document.

Determining an alikeness indicator 403 by comparing the one or more first face images and the one or more second face images, using an image processing method. For instance, the alikeness Indicator may be determined on the basis of a percentage of alikeness between two images.

Authenticating the identity of the person 404 depending on a result of the authenticating method performed for authenticating the ID document and whether the determined alikeness indicator is within an alikeness threshold. This threshold may be property amended to a predetermined value.

The main idea for validating the person is comparing for instance a validated face photo with another non-validated face photo. An alikeness indicator is then calculated. If the alikeness indicator is greater than a threshold, then the non-validated photo is validated. As a consequence, the person validation method is correct. Person validation, as a part of authentication process, needs a validated face photo. If the ID document validation process is correct, then the face photo printed in the document must be correct, and for instance a "selfie" photo taken by the device could be used to compare the face of the holder/owner with the validated face ID document photo.

When the ID document comprises a memory chip containing image data accessible by wireless communication and the device comprises functionalities for establishing a data communication with the memory chip (for instance NFC), the authenticating method, particularly for validating the person, may also comprise obtaining or receiving (from an outer source) one or more third face images of the person from the chip of the ID document through an NFC communication between the device and the chip.

As above mentioned NFC technology is only a possible example for storing pre-recorded data in the ID document. Any other technology could be used as a RFID based protocol.

In this example determining the alikeness indicator further comprises comparing the one or more third face images of the person with the one or more first face images of the person and/or the one or more second face images of the person using an image processing method.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

Further, although the examples described with reference to the drawings comprise computing apparatus/systems/devices and processes performed in computing apparatus/systems/devices, the invention also extends to computer programs, particularly computer programs on or in a carrier, adapted for putting the system into practice.

The invention claimed is:

1. An authenticating method for authenticating a document comprising: receiving one or more obtained images of the document; detecting one or more elements of the document; obtaining at least one parameter of the detected elements, by processing the one or more obtained images of the document using an image processing method; determining at least one meta-characteristic by comparing at least one parameter of the detected elements to at least one reference parameter of one or more pre-obtained elements; determining an authenticity indicator of the document by verifying whether the at least one meta-characteristic is within at least one predefined threshold associated with the at least one meta-characteristic, wherein the at least one meta-characteristic is at least one measurement of a difference of at least one parameter of a detected element relative to at least one reference parameter of at least one reference model, the reference model comprising the one or more pre-obtained elements.

2. The authenticating method according to claim 1, wherein the comparing at least one parameter of the detected elements to at least one reference parameter of pre-obtained elements comprises: obtaining at least one reference parameter by calculating at least one statistical element of at least one parameter of pre-obtained elements of a plurality of documents; wherein the predefined threshold comprises the at least one statistical element.

3. The authenticating method according to claim 1, wherein comparing at least one parameter of the detected elements to at least one reference parameter of the one or more pre-obtained elements comprises: decoding at least part of the detected elements for obtaining a unique identifier of the document; accessing at least one database of reference parameters of pre-obtained elements by using the obtained unique identifier of the document.

4. The authenticating method according to claim 3, wherein the at least one reference parameter of at least one pre-obtained element is obtained at or after the time of manufacturing or issuing of the document by: detecting one or more elements of the document; determining at least one parameter of at least one element of the document; decoding at least part of the detected elements for obtaining a unique identifier of the document; storing the unique identifier and the at least one parameter of at least one element of the document in the database as at least one reference parameter.

5. The authenticating method according to claim 1, wherein the at least one meta-characteristic comprises at least one measurement of difference in a parameter of alignment deviation between the deviation of alignment of at least two different elements of the detected elements and the deviation of alignment of the same at least two different elements of the reference model.

6. The authenticating method according to claim 1, wherein the at least one meta-characteristic comprises at least one measurement of difference in a parameter of height between at least a detected element and the same at least element of the reference model.

7. The authenticating method according to claim 1, wherein the at least one meta-characteristic comprises at least one measurement of difference in a parameter of width between at least a detected element and the same at least element of the reference model.

8. The authenticating method according to claim 1, wherein the at least one meta-characteristic comprises at least one measurement of difference in a parameter of color between at least a detected element and the same at least element of the reference model.

9. The authenticating method according to claim 1, wherein the at least one meta-characteristic comprises at least one measurement of difference in a parameter of texture between at least a detected element and the same at least element of the reference model.

10. The authenticating method according to claim 1, wherein the at least one meta-characteristic comprises at least one measurement of difference in a parameter of excess or deficiency of printing material between at least a detected element and the same at least element of the reference model.

11. The authenticating method according to claim 1, wherein the at least one element is at least one of pattern and drawing element, text element, light sensitive element, optical sensitive element, IR sensitive element, UV sensitive element, magnetic sensitive element, thermal sensitive element.

12. The authenticating method according to claim 1, wherein the one or more images of the document are obtained through a camera and the authenticating method further comprises: determining when the camera is capturing a complete view of the document by using the image processing method based on artificial intelligence, trained to detect the document, and automatically shooting the camera when the image processing method determines that the complete view of the document is depicted.

13. The authenticating method according to claim 2, wherein the authenticating method further comprises adjusting one or more focusing and lighting conditions by regulating the illumination unit of the camera.

14. The authenticating method according to claim 1, wherein the one or more obtained images of the document are at least two photos of the document, wherein at least one is taken with flash and at least one is taken without flash in such a way as to detect light sensitive elements, the at least two photos being taken in a random order, separated by a random time lapse.

15. The authenticating method according to claim 1, wherein the authenticating method further comprising: determining at least a further authenticity indicator of the document by verifying whether at least one authenticity validation satisfies at least one predefined requirement associated with the at least one authenticity validation.

16. The authenticating method according to claim 15, wherein the authenticity validation comprises at least one of: logical text validations, micro-writing validations, validations of at least one optical sensitive element and validations of at least one light sensitive element or combinations thereof.

17. The authenticating method according to claim 15, wherein the document comprises a chip containing data, the authenticating method comprising: receiving stored data of the chip; comparing the data received from the document to at least one data stored in the chip; and determining a further authenticity indicator of the document.

18. An authenticating method for authenticating an identity of a person comprising: performing an authenticating method for authenticating a document of the person comprising: receiving one or more obtained images of the document; detecting one or more elements of the document; obtaining at least one parameter of the detected elements, by processing the one or more obtained images of the document using a first image processing method; determining at least one meta-characteristic by comparing at least one parameter of the detected elements to at least one reference parameter of one or more pre-obtained elements; determining an authenticity indicator of the document by verifying whether the at least one meta-characteristic is within at least one predefined threshold associated with the at least one meta-characteristic, wherein the at least one meta-characteristic is at least one measurement of a difference of at least one parameter of a detected element relative to at least one reference parameter of at least one reference model, the reference model comprising the one or more pre-obtained elements; the document being an ID document; the authenticating method for authenticating an identity of a person further comprising: receiving one or more first face images of the person; receiving one or more second face images of the person included in the ID document by processing one or more images of the ID document using a second image processing method, the one or more images of the ID document being received by the authenticating method performed for authenticating the ID document; determining an alikeness indicator by comparing the one or more first face images and the one or more second face images, using the second processing method; and authenticating the identity of the person depending on a result of the authenticating method performed for authenticating the ID document and whether the determined alikeness indicator is within an alikeness threshold.

19. The authenticating method according to claim 18, wherein the ID document comprises a memory chip containing image data, the authenticating method comprising: receiving one or more third face images of the person from the chip of the ID document, and determining the alikeness indicator further comprises comparing the one or more third face images of the person with the one or more first face images of the person and/or the one or more second face images of the person using the second image processing method.

20. A computing device comprising a memory and a processor, embodying instructions stored in the memory and executable by the processor, the instructions comprising functionality to execute an authenticating method for authenticating a document comprising: receiving one or more obtained images of the document; detecting one or more elements of the document; obtaining at least one parameter of the detected elements, by processing the obtained one or more images of the document using an image processing method; determining at least one meta-characteristic by comparing at least one parameter of the detected elements to at least one reference parameter of one or more pre-obtained elements; determining an authenticity indicator of the document by verifying whether the at least one meta-characteristic is within at least one predefined threshold associated with the at least one meta-characteristic, wherein the at least one meta-characteristic is at least one measurement of a difference of at least one parameter of a detected element relative to at least one reference parameter of at least one reference model the reference model comprising the one or more pre-obtained elements.

* * * * *